(12) United States Patent  
Conte et al.

(10) Patent No.: US 9,372,536 B2  
(45) Date of Patent: Jun. 21, 2016

(54) TOUCH SCREEN WITH TACTILE FEEDBACK

(75) Inventors: Thomas M. Conte, Atlanta, GA (US); Bill Mangione-Smith, Kirkland, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1133 days.

(21) Appl. No.: 12/479,280

(22) Filed: Jun. 5, 2009

(65) Prior Publication Data

US 2010/0308983 A1    Dec. 9, 2010

(51) Int. Cl.
| | |
|---|---|
| G08B 6/00 | (2006.01) |
| G08B 5/22 | (2006.01) |
| G06F 3/01 | (2006.01) |
| G06F 3/041 | (2006.01) |
| G06F 3/0488 | (2013.01) |

(52) U.S. Cl.
CPC .............. *G06F 3/016* (2013.01); *G06F 3/041* (2013.01); *G06F 3/0488* (2013.01)

(58) Field of Classification Search
USPC ............... 345/171, 156, 168, 169, 173–178; 178/18.01–18.09, 18.11; 715/701–702, 715/821, 823, 865; 340/407.1, 407.2; 463/30

See application file for complete search history.

(56) References Cited

U.S. PATENT DOCUMENTS

| | | | |
|---|---|---|---|
| 7,084,859 B1 * | 8/2006 | Pryor | 345/173 |
| 7,245,292 B1 * | 7/2007 | Custy | 345/173 |
| 2007/0013677 A1 * | 1/2007 | Rosenberg et al. | 345/173 |
| 2007/0236475 A1 * | 10/2007 | Wherry | 345/173 |
| 2007/0247439 A1 * | 10/2007 | Daniel et al. | 345/173 |
| 2008/0068351 A1 * | 3/2008 | Rosenberg et al. | 345/173 |
| 2008/0259344 A1 * | 10/2008 | Osborn et al. | 356/450 |
| 2009/0002328 A1 * | 1/2009 | Ullrich et al. | 345/173 |
| 2009/0073128 A1 * | 3/2009 | Marsden | 345/168 |
| 2009/0079550 A1 * | 3/2009 | Makinen et al. | 340/407.2 |
| 2009/0091551 A1 * | 4/2009 | Hotelling et al. | 345/174 |
| 2009/0107737 A1 * | 4/2009 | Reynolds et al. | 178/18.06 |
| 2009/0141690 A1 * | 6/2009 | Fan et al. | 370/335 |
| 2010/0090813 A1 * | 4/2010 | Je et al. | 340/407.2 |
| 2010/0141407 A1 * | 6/2010 | Heubel et al. | 340/407.1 |

* cited by examiner

*Primary Examiner* — Ilana Spar  
*Assistant Examiner* — Jeffrey S Steinberg  
(74) *Attorney, Agent, or Firm* — Brundidge & Stanger, P.C.

(57) ABSTRACT

Examples of sensing a human touch to a touch screen and providing tactile and visual feedback are disclosed.

17 Claims, 3 Drawing Sheets

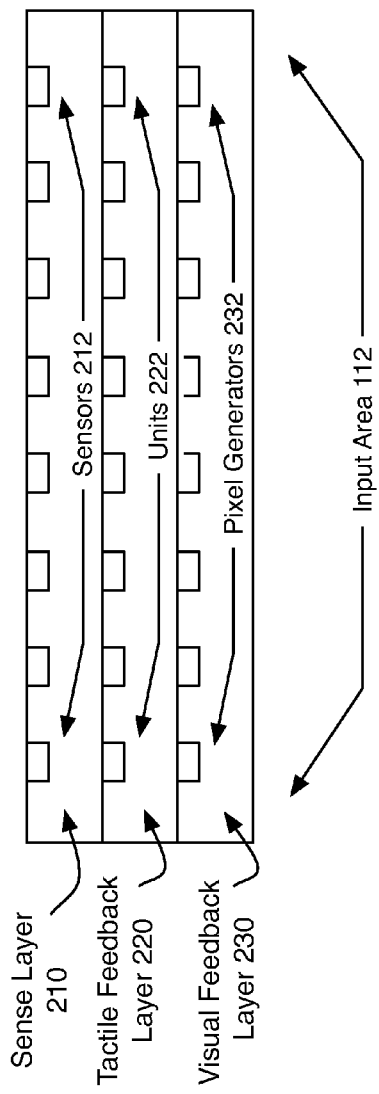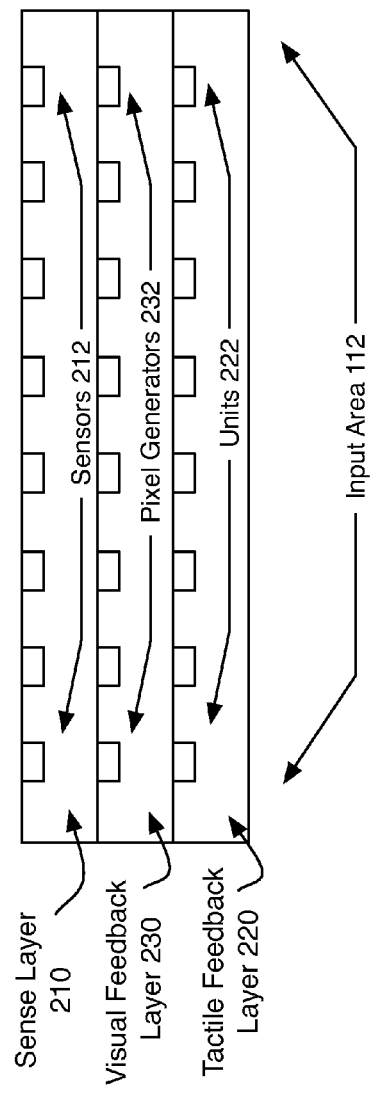

TOUCH SCREEN WITH TACTILE FEEDBACK

BACKGROUND

Touch screens are increasingly being used as input means for computing devices. In some instances, for example, a touch screen may serve as the primary input for a computing device such as, for example, a smart phone, a tablet personal computer or other types of portable computing devices. A user of these devices may place a high level of importance on a touch screen that accurately responds to the user's desired inputs.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2A provides an illustrative example of a layered view of an exposed portion of the system;

FIG. 2B provides another illustrative example of a layered view of an exposed portion of the system.

DETAILED DESCRIPTION

Figure 1:
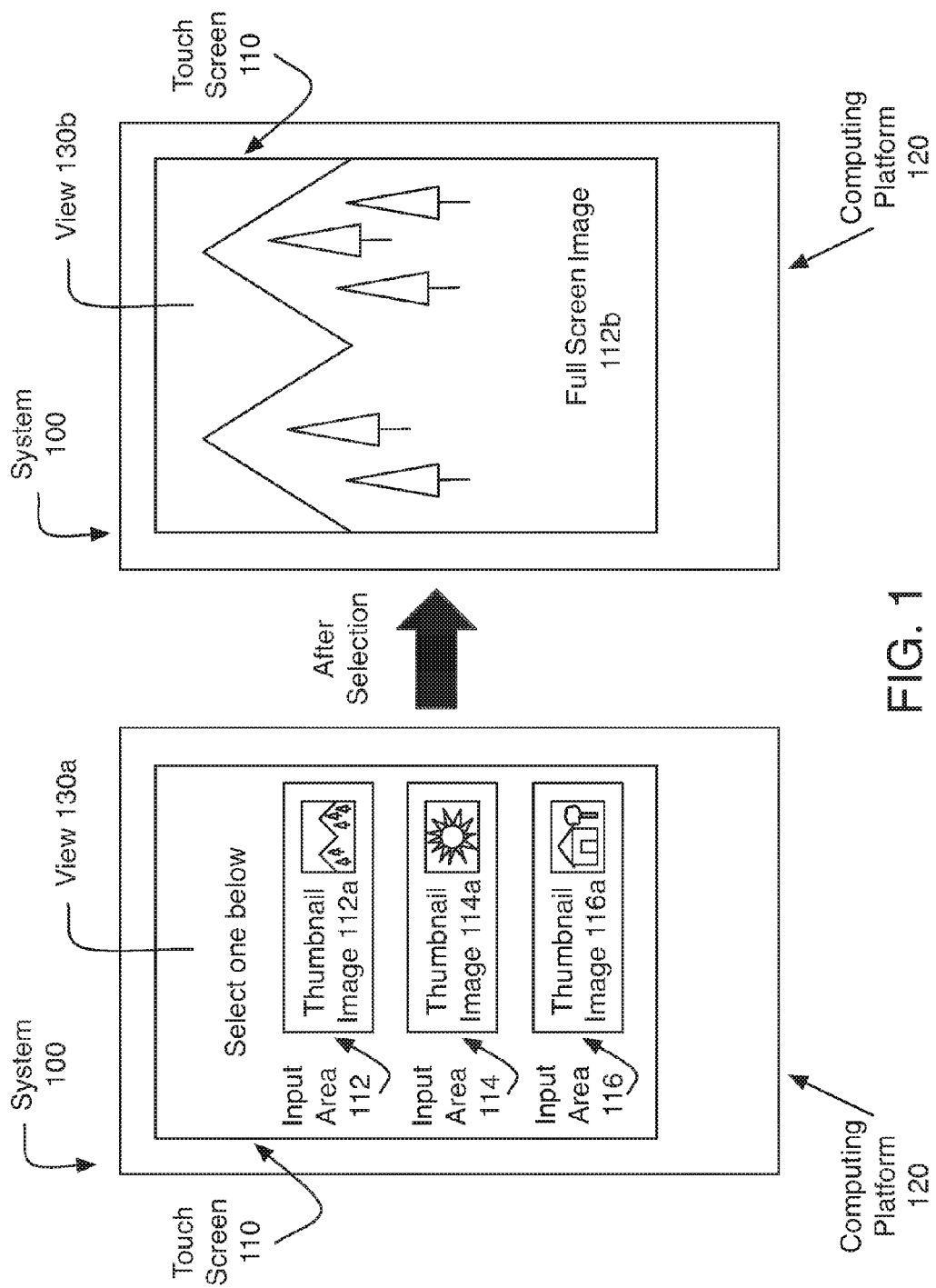
FIG. 1 provides an illustrative example system before and after a human touch is sensed.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus and systems related to sensing a human touch and providing tactile and visual feedback to a human associated with the human touch.

As mentioned in the background, a user of a touch screen may place a high level of importance on the accuracy of the touch screen. A user may become frustrated if the user touches portions of the screen to indicate a sequence of relatively rapid input choices (e.g., forming a word or making a series of menu entries) but notices that the visual feedback responsive to those inputs is inaccurate. Inaccuracies, for example, may include entries that were missed because the user's touch was not sensed by the touch screen. A user may then have to reenter an input and may also slow down the rate at which future input choices are made. The slow down, for example, may be due to the user visually verifying that the input was correctly sensed before moving on to the next input. Other types of feedback such as tactile feedback may provide the user with an additional way to confirm that an input choice was likely sensed by the touch screen. This may minimize reentries on the touch screen and may also allow the user to increase the rate of input choices.

In one example, a human touch is sensed (e.g., by a layer of a touch screen). The human touch may indicate a user input (e.g., selection of a visual character) to a computing device. Also responsive to the human touch, for example, tactile feedback may be provided (e.g., a vibration). An input signal associated with the user input, for example, may be generated. Visual feedback, for example, may then be provided based, at least in part, on the input signal. For this example, sensing the human touch and providing tactile feedback may occur in a manner such that the visual feedback is substantially unobstructed as observed by a human for the human touch. For example, sensing elements and tactile feedback elements are not visible to an unaided human eye.

FIG. 1 provides an illustrative example system 100 before and after a human touch is sensed. System 100, for example, may represent a computing device that includes, but is not limited to, a digital broadband telephony device (e.g., a smart phone), a mobile internet device (MID) an ultra mobile computer (UMC), a notebook computer, a laptop computer, a tablet computer, a desktop computer system, a server computer system, a digital home network device (e.g., cable/satellite/set top box, etc.), a personal digital assistant (PDA), a navigation device, a game player, a music player or a video player. As shown in FIG. 1, for example, system 100 includes a touch screen 110 and a computing platform 120. Touch screen 110, for example, may provide both an input and output for computing platform 120. Computing platform 120, for example, may include memory and one or more processing components (e.g., chipsets, microprocessors, graphics engines, etc.) for system 100.

Although FIG. 1 shows touch screen 110 and computing platform 120 as closely coupled together, this disclosure is not limited to only this type of coupling. For example, touch screen 110 may serve as a monitor and computing platform 120 may serve as a computer tower or chassis for a desktop or server computer system. In this example, touch screen 110 may be located up to several feet from computing platform 120.

In one example, view 130a depicts a view as seen by a user of system 100 before the user makes an input selection. View 130a, for example, includes input areas 112, 114 and 116. Input areas 112, 114 and 116, for example, may include visual representations of possible input selections a user may make. Those visual representations are shown in FIG. 1 as image thumbnails 112a, 114a and 116a, although this disclosure is not limited to only thumbnail images as visual representations. Other types of visual representations may include, but are not limited to, an alphabetic representation (e.g., QWERTY keyboard), a numeric representation, checkboxes, ovals, hyperlinks, etc.

In one example, a user may desire to see an enlarged or full screen image of thumbnail 112a. The user for example, may touch input area 112. As described more below, touch screen 110 may include several layers to sense the touch, generate an input signal associated with the sensed touch and provide tactile and visual feedback. Tactile feedback, for example, may include, but is not limited to, a vibration in the area at or near the touch. In this example, the vibration may be in the area of input area 112.

View 130b of FIG. 1 depicts an example of visual feedback provided to a user after the human touch was sensed. For example, responsive to sensing the user's touch to input area 112, an input signal associated with the user's input selection is generated. This input signal, for example, may be an indication that the user desires a full screen image associated with thumbnail image 112a and may also be an indication that the user's human touch was sensed. Responsive to the input signal, full screen image 112b is provided as visual feedback on view 130b. This visual feedback, for example, is provided to the user in a manner such that user observes a substantially unobstructed view of full screen image 112b. Thus, for example, the user may not notice layers within touch screen 110 that sense and/or provide tactile feedback to the user.

FIG. 2A provides an illustrative example of a layered view of an exposed portion of system 100. In one example, the exposed portion corresponds to layers beneath input area 112. The same or substantially similar layers, for example, may also lie beneath input areas 114 and 116 or may lie beneath most if not all of touch screen 110. The layers illustrated in FIG. 2A, for example, include sense layer 210, tactile feedback layer 220 and visual feedback layer 230. Although not shown in FIG. 2A, each of these layers may also include one or more additional layers including structures and/or circuitry to enable layers 210, 220 and 230 to sense a human touch and provide tactile and visual feedback.

In one example, as shown in FIG. 2A, sense layer 210 is the upper layer of touch screen 110. Sense layer 210, for example, includes one or more sensors 212 to sense human touch. Sensors 212 may include, but are limited to, sensors that may sense human touch via resistive, surface acoustic wave, capacitive, infrared, optical imaging, dispersive signal, acoustic pulse recognition or other types of touch sensing technologies.

In one example, responsive to sensing the human touch, sensors 212 may generate an input signal. As mentioned above, the input signal may be an indication of a user's input. Thus, as described in more detail below, elements in visual feedback layer 230 may provide visual feedback responsive to receiving this input signal.

In one example, sensors 212 sense human touch via a capacitive technology. In this example, sensors 212 may include a thin coating of indium tin oxide (ITO) that may conduct a continuous electrical current across sensors 212. Sensors 212 may then maintain a measured capacitance and a human touch may be sensed when the measured capacitance is altered by the human touch. ITO, for example, may be substantially transparent and colorless in thin layers or coating. Thus, in this example, visual feedback from visual feedback layer 230 is substantially unobstructed by sensors 212.

In one example, as shown in FIG. 2A, tactile feedback layer 220 is the middle layer of touch screen 110 and includes one or more units 222. In one embodiment, units 222 may include micro electromechanical machines (MEMs) to provide tactile feedback in response to a sensed human touch. In this MEMs embodiment, units 222 may be sufficient in number to provide tactile feedback (e.g., vibration, flexing, pushback, controlled pulse) to a user whose human touch was sensed. Yet, for example, units 222 are small, thin or transparent enough so that visual feedback from visual feedback layer 230 is substantially unobstructed to the user.

In one example, MEMs, may include piezoelectric devices. One type of piezoelectric device may include a clear piezoelectric crystal (e.g., gallium phosphate, quartz, or tourmaline) that vibrates after voltage is applied. Piezoelectric crystals, for example, may be applied in a thin film manner to the MEMs included in units 222. The piezoelectric crystals, for example, may be applied in the thin film manner such that the piezoelectric crystals are thick enough to provide tactile feedback but thin enough to allow a substantially unobstructed visual feedback from visual feedback layer 230.

In one embodiment, a MEMs including a clear piezoelectric crystal may receive a voltage responsive to a human touch being sensed (e.g., sensed by sensors 212). The voltage, for example, may cause the clear piezoelectric crystal to vibrate and provide tactile feedback at or near the area of the human touch. This voltage, for example, may be generated in response to receiving an input signal from sensors 212 that indicates a human touch was sensed in a given area of touch screen 110 (e.g., input area 112).

In another embodiment in which units 222 include one or more MEMs, the MEMs may use a clear piezoelectric crystal layer within tactile feedback layer 220 for a source of a voltage. In this example, sense layer 210 may be slightly flexible. A human touch, for example, may cause a slight depression in sense layer 210. The clear piezoelectric crystal in tactile feedback layer 220, for example, also may be slightly depressed. The slight depression, for example, may compress the piezoelectric crystal and induce a voltage across the piezoelectric crystal. The voltage, for example, may be used by the one or more MEMs to power a form of tactile feedback (e.g., a controlled pulse, vibration, pushback or flexing) to an area at or near that of the human touch. In this other example, the piezoelectric crystals may be applied in the thin film manner such that the piezoelectric crystals are thick enough to provide sufficient voltage to power the form of tactile feedback but thin enough to allow a substantially unobstructed visual feedback from visual feedback layer 230. Also, for example, the one or more MEMs that provide the form of tactile feedback may be spaced or arranged such that visual feedback is substantially unobstructed.

In one example, as shown in FIG. 2A, visual feedback layer 230 is the lower layer of touch screen 110. Visual feedback layer 230, for example, includes one more pixel generators 232. One or more pixel generators 232, for example, may be activated to provide visual feedback, for example, using thin film transistor liquid crystal display (TFT-LCD), organic light emitting diodes (OLED), interferometric modulator display (IMOD), electrophoretic display or other types of flat screen display technologies, although this disclosure is not limited to only these display technologies.

In one embodiment, one or more pixel generators 232 are activated in response to an input signal generated by sensors 212. As mentioned above, the input signal may be responsive to sensing a human touch. The human touch, for example, may indicate a user's input. Thus, for example, the input signal may indicate to pixel generators 232 to provide a visual feedback that matches or is associated with the user's input, e.g., provide a full image of a selected thumbnail image, highlight a selected character or output the selected character to a portion of touch screen 110. Associated elements to receive the input signal and/or activate pixel generators 232 are not shown. These associated elements, for example, may include logic (e.g., controllers, memory, firmware/software), communication links, power sources or light sources associated with the technology being used, e.g., TFT-LCD, OLED or IMOD.

FIG. 2B provides another illustrative example of a layered view of an exposed portion of the system 100. In this other illustrative example, visual feedback layer 230 is the middle layer and tactile feedback layer 220 is the bottom or lower layer of touch screen 110. In one embodiment, visual feedback layer 230 uses OLED technology and does not use a backlight. Thus, for example, a visual feedback layer 230 that uses OLED technology may be thin enough to allow tactile feedback layer 220 to provide tactile feedback through the visual feedback layer 230. In this embodiment, tactile feedback layer 220 may operate similar to the examples mentioned above, e.g., using MEMs and/or clear piezoelectric crystals or other means to provide a form of tactile feedback. Also, since tactile feedback layer 220 is located below visual feedback layer 230, tactile feedback can be provided in a way that may not substantially obstruct visual feedback as viewed by a user providing a human touch to touch screen 110.

Although OLED is mentioned as a possible thin display technology that does not use a backlight, this disclosure is not limited to only the use of OLED technology when visual feedback layer 230 is a middle layer and tactile feedback layer 220 is a lower layer. Other types of thin display technologies that do not use a backlight may be used to provide visual feedback.

Figure 3:
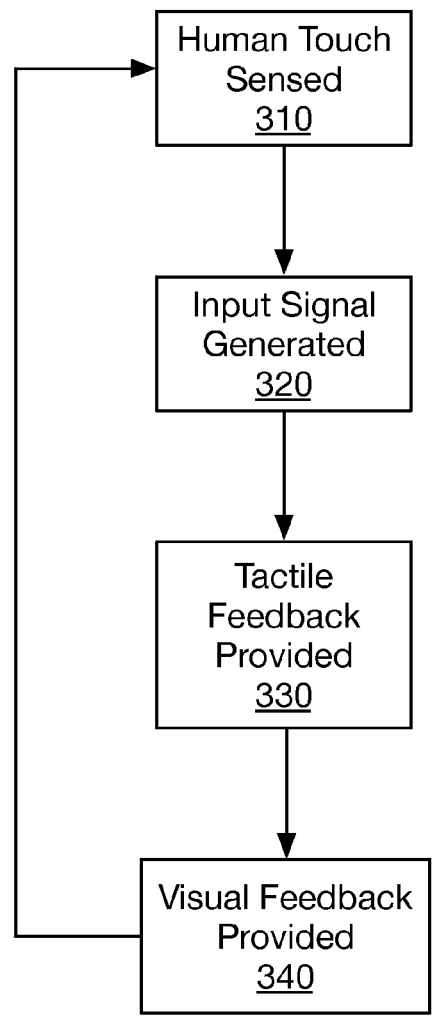
FIG. 3 is a flow chart of an example method to provide tactile and visual feedback.

FIG. 3 is a flow chart of an example method to provide tactile and visual feedback. In one example, system 100, as described for FIGS. 1 and 2A-B, is used to describe this method, although this method is not limited to only an implementation on system 100. The method, for example, may be implemented on other systems that may include at least a portion of the elements of system 100.

In block 310, for example, a human touch is sensed. The sensed human touch, for example, may be the result of a user touching a portion of touch screen 110 (e.g., input area 112, 114 or 116). In this example, sense layer 210 is the upper layer of touch screen 110. As described above, for example, sense layer 210 includes sensors 212. Sensors 212, for example, may use at least one of the touch sensing technologies mentioned above (e.g., capacitive) to sense the human touch.

In block 320, for example, responsive to sensing the human touch, an input signal is generated by sensors 212. This input signal, for example, may be an indication of a user's input (e.g., selection of thumbnail image 112a) and may also be an indication that the user's human touch was sensed.

In block 330, for example, responsive to the human touch being sensed, tactile feedback is provided. In one example, responsiveness to the human touch may include, for example, receiving the input signal generated by sensors 212. This input signal, for example, may indicate to units 222 in tactile feedback layer 220 to provide a form of tactile feedback (e.g., vibration, flexing, pushback, controlled pulse, etc.).

In another example, responsiveness to the human touch may also include, for example, tactile feedback layer 220 being at least slightly depressed by the human touch. The at least slight depression may cause elements (e.g., a piezoelectric device) included in tactile feedback layer 220 to provide a voltage that may be used to provide a form of tactile feedback (e.g., a vibration). Thus, in this other example, tactile feedback layer 220 may provide tactile feedback that is responsive to the human touch and may be independent of receiving the input signal generated by sensors 212.

In block 340, for example, visual feedback layer 230 provides visual feedback. The visual feedback, for example, may be based, at least in part, on the input signal generated by sensors 212. The input signal, for example, may cause visual feedback layer 230 to activate one or more pixel generators 232 to provide a visual feedback that matches or is associated with the user input. This visual feedback, for example, is provided to the user in a manner such that user observes a substantially unobstructed view of the provided visual feedback. Thus, for example, the user may not visibly notice elements included in sense layer 210 and tactile feedback layer 220.

In one example, a full screen image may be provided based on a visual indication in an area of touch screen 110 that a full screen image would be provided as a form of visual feedback if that area was touched. In another example, an input area of touch screen 110 may include an alphanumeric input area. The alphanumeric input area, for example, may include a visual representation of the capitalized letter A. The visual feedback that matches a user input indicating a selection of the capitalized letter A, in this example, may include the capitalized letter A being enlarged or highlighted and/or being outputted in another portion of touch screen 110.

In one example, another human touch may be sensed. In this example, the process returns to block 310.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" or "coupled with" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:
    receiving, by a computing device, an input responsive to a user contact with a surface of a first layer of a touch screen, the first layer comprising one or more sensors configured to sense the user contact;
    generating an input signal associated with the input;
    providing tactile feedback responsive to the user contact via one or more micro electromechanical machines (MEMs) included in a second layer of the touch screen, the second layer of the touch screen being below the first layer of the touch screen; and
    providing visual feedback via a third layer of the touch screen based, at least in part, on the input signal, the third layer of the touch screen being below the second layer of the touch screen, wherein the first layer and the second layer are substantially transparent and wherein the visual feedback is visible through the first layer which is sensitive to the user contact and through the second layer configured to provide the tactile feedback;
    wherein the visual feedback comprises highlighting, enlarging or moving a visual representation of an image associated with the input, and
    wherein receiving the user contact with the surface of the first layer comprises:
        receiving a user touch against the surface of the first layer,
        inducing a voltage across the second layer by compressing at least one piezoelectric crystal in the second layer in response to the user touch against the surface of the first layer, and
        inducing the tactile feedback provided via the one or more MEMs using the voltage induced across the second layer.

2. The method according to claim 1, wherein the third layer comprises at least one of a liquid crystal display (LCD), an organic light emitting diodes (OLED) display, an interferometric modulator display (IMOD) or an electrophoretic display.

3. The method according to claim 1, wherein the computing device includes one of a digital broadband telephony device, a notebook computer, a tablet computer, a desktop computer, a personal digital assistant, a navigation device, a game player, a music player or a video player.

4. An apparatus comprising:
    a first layer to generate an input signal in response to sensing a user contact, the input signal associated with a user input to a computing device;
    a second layer to provide tactile feedback responsive to the user contact, wherein the second layer includes one or more micro electromechanical machines (MEMs); and
    a third layer to provide visual feedback responsive to the input signal generated by the first layer,
    wherein the third layer is configured to display the visual feedback substantially simultaneously with the tactile feedback,
    wherein the visual feedback comprises an indicator configured to identify an intended action associated with the input signal to provide a visual confirmation to indicate that a user has made an intended selection, and
    wherein the first, second and third layers are arranged such that visual feedback provided by the third layer is substantially unobstructed by the first and second layers and the third layer is below the first and second layers and wherein the visual feedback is visible through the first layer and through the second layer;
    wherein the visual feedback comprises highlighting, enlarging or moving a visual representation of an image associated with the user input, and
    wherein sensing the user contact comprises receiving a user touch against the surface of the first layer, and wherein the first layer:
        induces a voltage across the second layer by compressing at least one piezoelectric crystal in the second layer in response to the user touch against the surface of the first layer, and induces the tactile feedback provided via the one or more MEMs using the voltage induced across the second layer.

5. The apparatus according to claim 4, wherein the first layer comprises one or more sensors configured to sense the user contact.

6. The apparatus according to claim 5, wherein the one or more MEMs provide tactile feedback via one of vibration, pushback, flexing or controlled pulse, and wherein the one or more sensors include indium tin oxide.

7. The apparatus according to claim 6, wherein the one or more MEMs to provide tactile feedback comprise a piezoelectric device, the piezoelectric device to include a clear piezoelectric crystal that vibrates based on a voltage to be applied to the clear piezoelectric crystal.

8. The apparatus according to claim 7, wherein the clear piezoelectric crystal comprises one of gallium phosphate, quartz or tourmaline.

9. The apparatus according to claim 4, wherein the third layer comprises at least one of a liquid crystal display (LCD), an organic light emitting diodes (OLED) display, an interferometric modulator display (IMOD) or an electrophoretic display.

10. The apparatus according to claim 4, wherein the third layer is configured to provide visual feedback via a display technology that includes organic light emitting diodes (OLED).

11. The apparatus according to claim 4, wherein the input signal comprises a request for a full screen image, wherein the third layer is configured to display the full screen image responsive to the input signal.

12. The apparatus according to claim 4, wherein the computing device includes one of a digital broadband telephony device, a notebook computer, a tablet computer, a desktop computer, a personal digital assistant, a navigation device, a game player, a music player or a video player.

13. A system comprising:
a computing platform; and
a touch screen coupled with the computing platform, the touch screen to include:
a first layer to generate an input signal in response to detection of a user contact, the input signal associated with a user input,
a second layer to provide tactile feedback responsive to the user contact, wherein the second layer includes one or more micro electromechanical machines (MEMs), the one or more MEMs to provide tactile feedback, and
a third layer to provide visual feedback responsive to the input signal generated by the first layer,
wherein the third layer is above the second layer,
wherein the one or more MEMs comprise a piezoelectric device, the piezoelectric device to include a piezoelectric crystal, based on the user contact that causes compression of the piezoelectric crystal through the first layer and the third layer, the piezoelectric crystal to provide a voltage to enable the one or more MEMs to provide tactile feedback to an area of the touch screen at or near a position of the user contact,
wherein the visual feedback comprises highlighting, enlarging or moving a visual representation of an image associated with the user input, and
wherein the detection of the user contact comprises receiving a user touch against the surface of the first layer, and wherein the first layer:
induces a voltage across the second layer by compressing at least one piezoelectric crystal in the second layer in response to the user touch against the surface of the first layer, and
induces the tactile feedback provided via the one or more MEMs using the voltage induced across the second layer.

14. The system according to claim 13, wherein the first layer comprises one or more sensors configured to sense the user contact.

15. The system according to claim 14, wherein the one or more MEMs provide tactile feedback via one of vibration, pushback, flexing or controlled pulse, and wherein the one or more sensors comprise indium tin oxide.

16. The system according to claim 13, wherein the piezoelectric crystal comprises one of gallium phosphate, quartz or tourmaline.

17. The system according to claim 13, wherein the third layer to provide visual feedback comprises a display technology that includes one of liquid crystal display (LCD), organic light emitting diodes (OLED), interferometric modulator display (IMOD) or electrophoretic display.

* * * * *